United States Patent [19]
Morefield

[11] Patent Number: 5,248,026
[45] Date of Patent: Sep. 28, 1993

[54] CONVEYOR BELT SCRAPER MECHANISMS

[76] Inventor: Allen J. Morefield, P.O. Box 534, Tazewell, Va. 24651

[21] Appl. No.: 916,755

[22] Filed: Jul. 22, 1992

[51] Int. Cl.⁵ .............................................. B65G 45/00
[52] U.S. Cl. .................................................... 198/499
[58] Field of Search ............................... 198/499, 497; 15/256.51, 256.6

[56] References Cited

U.S. PATENT DOCUMENTS

| | | |
|---|---|---|
| Re. 31,338 | 8/1983 | Hurt . |
| 3,342,312 | 9/1967 | Reiter ................................. 198/499 |
| 3,881,401 | 5/1975 | Bimba . |
| 3,973,595 | 8/1976 | Schmoll . |
| 4,053,045 | 10/1977 | Reiter . |
| 4,117,706 | 10/1978 | Lami . |
| 4,182,444 | 1/1980 | Fisher ................................ 198/499 |
| 4,189,046 | 2/1980 | Ward et al. ........................ 198/499 |
| 4,242,947 | 1/1981 | Renner et al. . |
| 4,269,301 | 5/1981 | Gibbs . |
| 4,280,531 | 7/1981 | Milberger et al. . |
| 4,402,394 | 9/1983 | Stoll .................................. 198/499 |
| 4,457,423 | 7/1984 | Stoll . |
| 4,506,742 | 3/1985 | Fukase . |
| 4,520,917 | 6/1985 | Sillivent et al. . |
| 4,533,036 | 8/1985 | Gordon . |
| 4,535,883 | 8/1985 | Kerr .................................. 198/499 |
| 4,633,999 | 1/1987 | Perneczky . |
| 4,674,397 | 6/1987 | Wilcox . |
| 4,696,388 | 9/1987 | Stoll . |
| 4,729,224 | 3/1988 | McAteer . |
| 4,734,013 | 3/1988 | Valavaara . |
| 4,768,645 | 9/1988 | Farris ................................ 198/499 |
| 4,825,997 | 5/1989 | Bowman et al. .................. 198/499 |
| 4,850,474 | 7/1989 | Schwarze ......................... 198/499 |
| 4,936,439 | 6/1990 | Alexander, Jr. et al. . |
| 5,007,523 | 4/1991 | Morefield ..................... 198/499 X |
| 5,007,524 | 4/1991 | Morefield ......................... 198/499 |

FOREIGN PATENT DOCUMENTS

| | | |
|---|---|---|
| 0004809 | 10/1979 | European Pat. Off. . |
| 0328171 | 8/1989 | European Pat. Off. . |
| 3409076 | 9/1985 | Fed. Rep. of Germany . |
| 3511277 | 10/1986 | Fed. Rep. of Germany ...... 198/499 |
| 3624623 | 3/1987 | Fed. Rep. of Germany . |
| 88/00916 | 2/1988 | PCT Int'l Appl. . |
| 2184084 | 6/1987 | United Kingdom ................ 198/499 |

OTHER PUBLICATIONS

Wolansky et al., Fundamentals of Fluid Power, 1977, pp. 58-68.
Machine Design, Fluid Power Reference Issue, Sep. 27, 1984, pp. 147-149.

*Primary Examiner*—D. Glenn Dayoan
*Attorney, Agent, or Firm*—Lowe, Price, LeBlanc & Becker

[57] ABSTRACT

An apparatus and a method are provided for controlling a force applied to actuate a belt scraper mechanism by the use of a pressurized fluid which moves a piston assembly, slidably contained within a cylinder, to transmit the force through a connecting piston rod to the scraper mechanism. A spring interposed between a pair of piston heads of the piston assembly is compressed by the pressurized fluid acting against one of the pistons to transmit resilient biasing force to the scraper mechanism through the other piston. The scraper mechanism is preferably formed of a hard material, such as metal, and the spring acts as a shock absorber permitting reverse movement of the scraping edge such as when encountering a transverse splice in the conveyor belt being cleaned. Grease is preferably used as the working fluid. The cylinder is transparent to allow exterior placement of a gauge of predetermined length thereagainst to enable calibration of force transmission by setting spring compression to the predetermined length.

21 Claims, 3 Drawing Sheets

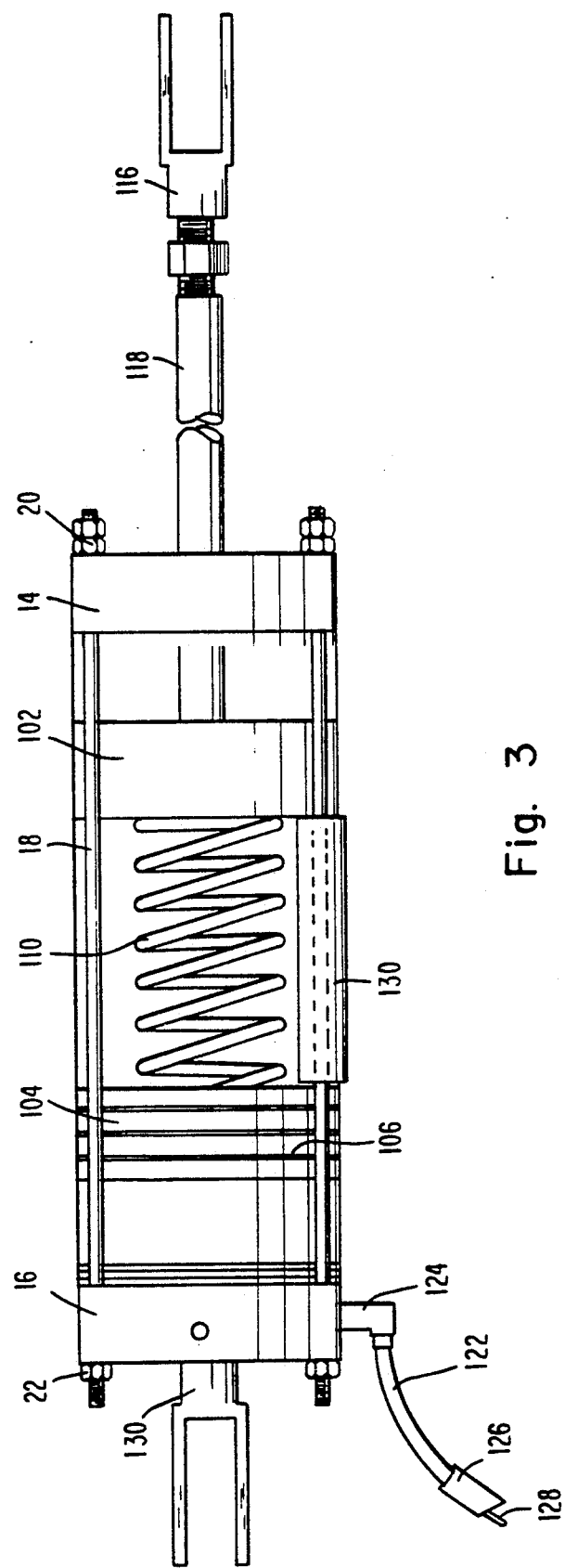

CONVEYOR BELT SCRAPER MECHANISMS

TECHNICAL FIELD

The present invention relates generally to conveyor belt scraper mechanisms and, more particularly, to belt scraper mechanisms utilizing a pressurized fluid to actuate a piston and cylinder arrangement for moving a scraper element into contact with a conveyor belt being cleaned.

BACKGROUND ART

In my prior U.S. Pat. No. 5,007,523, issued Apr. 16, 1991, entitled "Conveyor Belt Scraper Mechanisms", there is disclosed a belt scraper mechanism comprising a cylinder containing a piston slidably movable therein to rotate a belt scraper, via a piston connecting rod, into a scraping position to scrape clean a moving conveyor belt. The belt scraper includes a plurality of resilient belt scraper units which form a continuous scraping edge across substantially the full width of the belt.

By forming one or more of the scraping units adapted to contact center portions of the belt to be of greater hardness than adjacently mounted scraper units adapted to contact side portions of the belt, the substantially continuous scraping edge tends to wear evenly since abrasive material being conveyed usually collects in the center of the belt. Notwithstanding these advantages, there are certain applications where it is desirable to use a scraper element made of a hard, non-resilient material, such as metal, which would be subject to less wear and infrequent replacement relative to the resilient scraper units made of polyurethane as in my aforesaid prior invention.

However, when using a metal scraper element (or a like material which is subject to less wear relative to a polyurethane material as in my prior invention), it is important that the force transmitting mechanism has a shock-absorbing resiliency enabling the scraping edge to be pivoted out of contact with the belt such as when striking a transverse seam or splice connecting adjacent belt portions together. In certain types of conveyor operations, such splices may be formed from a transverse connecting bar which is bolted to overlapping edges of adjacent belt portions by means of nuts and bolts projecting upwardly from the surface of the conveyor belt. The scraping edge contacts such protrusions in a forceful manner (depending upon belt speed) and it is therefore important that the scraping edge has the ability to be pivoted or "rocked" away from the belt surface upon sudden contact with such protrusions without damaging the force transmitting mechanism. While the scraping units of my prior invention have inherent resiliency as a result of the resilient nature of the polyurethane material, such resilient scraper units were subject to premature wear under these types of operating conditions, requiring frequent repair or replacement.

It is accordingly one object of the present invention to provide a shock absorber in a force transmitting mechanism to enable a belt scraper mechanism to absorb incidental shock loading.

My other prior U.S. Pat. No. 5,007,524, issued Apr. 16, 1991, discloses a belt scraper blade wherein a spring clevis interconnects the distal end of a piston connecting rod to the crank extending from the belt scraper mounting shaft to absorb incidental shock loading. However, the use of such an externally mounted spring clevis in the rugged and hostile environment of the conveyor belt results in accumulation of detritus and other scraped material on the spring which may clog the spring and prevent shock-absorbing operations from occurring in a reliable manner. Also, such external placement of the spring tends to result in early wear and fatigue necessitating frequent repair or replacement. Further, the spring often bulged or kinked, preventing reliable operation.

Another object is to provide a shock-absorbing mechanism which is isolated from the external environment and therefore capable of reliable operation in a rugged and hostile environment.

In my prior '524 patent, pressurized water is utilized as a working fluid for applying a force to actuate the belt scraper mechanism to move a piston, slidably contained within a cylinder, interconnected to the belt scraper through the crank. The use of pressurized water minimizes the possibility of explosion or fire. However, water is sometimes unavailable or dangerous for use at below freezing temperatures as often occurs under certain mining operations.

Still another object is to provide a working fluid for actuating a belt scraper mechanism which fluid is normally available at mining sites and under other industrial conditions where materials in granular and pebble like form are often conveyed over long distances from conveyor belts which must be scraped clean.

DISCLOSURE OF THE INVENTION

A conveyor belt scraping assembly, in accordance with the present invention, comprises a scraper element movable into contact with a moving conveyor belt for scraping material from the belt, and means for positively maintaining the scraper element in scraping contact with the belt. Such maintaining means includes a cylinder and piston assembly. The piston assembly is connected through a piston rod to the scraper element. A spring is disposed in the cylinder in the line of transmission for resiliently biasing the scraper element against the belt through the connecting piston rod.

The feature of positioning the spring in the line of transmission within the cylinder advantageously allows the scraper element to be suddenly pivoted or rocked out of contact with the belt upon striking an unusually large object, such as a large piece of detritus on the belt which is difficult to dislodge, or a transverse seam or splice connecting adjacent portions of the belt together, and then automatically returned to scraping position under spring bias. Thus, the spring absorbs incidental shock loading while being isolated from the rugged and hostile operating environment by containment within the closed cylinder.

The piston assembly preferably includes a pair of first and second pistons each disposed within the cylinder with the spring positioned therebetween. The piston rod is connected to the second piston and means is provided for moving the first piston towards the second piston to thereby compress the spring and transmit movement to the second piston to pivot the scraper element into contact with the moving conveyor belt. The moving means preferably includes means for admitting a fluid into a chamber formed between the cylinder and a side of the first piston opposite the other side thereof facing the spring.

In accordance with a further improvement feature of this invention, the working fluid is a grease such as the type normally available for lubrication of machine components with a hand grease gun. A flexible line is connected at one end thereof to the cylinder and includes a grease fitting at the other or free end thereof and a check valve for connection to a source of grease such as the hand grease gun. In this manner, grease is injected into the cylinder to advance the first piston toward the second piston. The resulting spring compression transmits resilient biasing movement to the scraper element which is rotated into scraping contact with the moving conveyor belt and maintained thereagainst by the constant pressure of the grease in the closed cylinder chamber acting against the second piston through the first piston and compressed spring therebetween.

The cylinder is preferably transparent to permit visual observation of the piston assembly. A pair of end caps are respectively mounted to opposite ends of the cylinder and plural connecting rods extending along outer surfaces of the cylinder interconnect these caps. In accordance with a further feature of the invention, a calibration slide of predetermined length is mounted for sliding movement along one of the connecting rods. The pressure transmitted by the spring to the scraper element may be calibrated to a predetermined loading by admitting actuating fluid into the cylinder to compress the spring to said predetermined length or a known fraction thereof by visual comparison with the calibration slide.

A method of cleaning a moving conveyor belt with a scraper element interconnected through a connection piston rod to a piston assembly movable within a cylinder is also disclosed. The method comprises the steps of admitting a fluid into one end of the cylinder to compress a spring within the cylinder through fluid actuated movement of the piston assembly to thereby move the scraper element into cleaning, scraping contact with the belt. The further admission of fluid into the cylinder is prevented after compressing the spring to the predetermined length so that a predetermined force is transmitted to the scraper element.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 3 is a sectional view of the assembled piston and cylinder arrangement of FIG. 2.

BEST MODE FOR CARRYING OUT THE INVENTION

Figure 1:
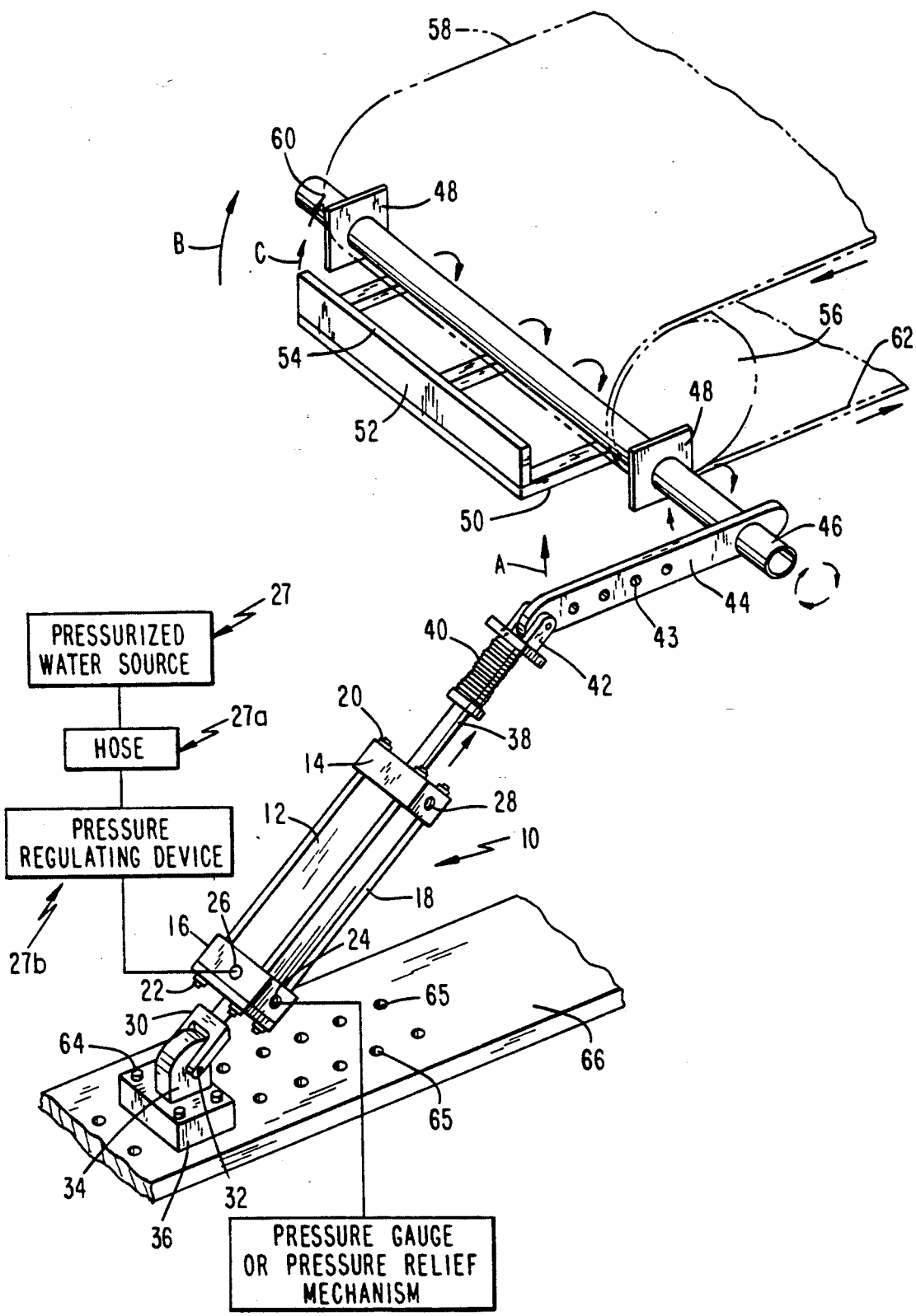
FIG. 1 is a perspective view of a blade-scraping assembly as disclosed in my prior U.S. Pat. No. 5,007,524.

In FIG. 1, there is disclosed a belt scraping apparatus 10 including a cylinder 12 in sealing contact with upper and lower end caps 14 and 16 sealed to ends of the cylinder with plural tension rods 18 each applying a predetermined tightening force to the end caps by conventional heads or nuts 20 and 22, respectively. The lower end cap 16 may be provided with two openings or ports 24 and 26 formed to receive known types of fittings. One of these openings or ports 26 is connected to a pressurized water source 27 through a hose 27a and an optional pressure regulating device 27b to admit pressurized water into the lower end of cylinder 12 where it acts on a piston head of a single acting type slidably contained within the cylinder.

The pressurized water source, in a mining environment for example and as in the present invention, is preferably a conventional pumping station P that generally comprises an available source of water supplied by a pump located outside the mine through a hose to the mining site at a pressure generally between 45-300 psi. This pressurized water is conventionally used for cleaning of equipment, and as a means for fighting fires within the mine. The piston within the cylinder is of a single acting type in that the piston is moved to and maintained at the upper end of the cylinder under the action of pressurized water to maintain the belt scraper described more fully below in contact with the conveyor belt until such time as the supply of pressurized water into the lower end of the cylinder is shut off via the pressure regulating device. The other opening 24 is for connection to a pressure release mechanism and preferably a pressure gauge. A closeable fitting 28 in the upper end cap 14 allows drainage of any pressurized water that may leak past the piston head contained within the cylinder 12 during use.

The pressurized water cylinder assembly described above is mounted by an attachment fork 30 (secured to the bottom of end cap 16) to a base 36 via rotatable connection to a trunnion 34 with pin 32. The piston is connected to a connecting rod 38 sealingly and slidably guided through upper end cap 14. Rod 38 is moveable in opposite directions indicated by arrow A in a direction parallel to the cylinder axis. The cylinder 12, the piston therewithin, end caps 14 and 16, are preferably made up of materials which are not corroded by the pressurized water, such as fiber glass, acrylic plastics, or reinforced composites that are readily lubricated by water without the need for externally provided lubrication.

The upper end of connecting rod 38 supports a fork element 42 rotatably pinned to a lever arm 44 rigidly connected to a shaft 46 rotatably supported in a pair of bearings 48.

A plurality of through holes 43 are distributed along the length of arm 44 for selective engagement of pin 42 therethrough, which persons skilled in the mechanical arts will immediately appreciate as a means to discretely adjust the moment arm at which the connecting rod force is applied about the axis of shaft 46.

Rigidly attached to a portion of shaft 46 between supporting journal bearing elements 48 is a transverse element 50 at a distal end of which is attached a scraper blade element 52 having a scraping edge 54. As is indicated in phantom lines in FIG. 1, a cylinder 56 of circular cross-section is conventionally used to support and guide thereover an approaching length 58 of a moving belt which passes over the cylindrical outer surface of cylinder 56 and returns for reloading as a moving length 62 of the belt. Naturally, the scraper blade element 52 must be so positioned vis-a-vis cylinder 56 and the moving belt as to be itself movable into controlled scraping contact with moving belt length 62.

Figure 2:
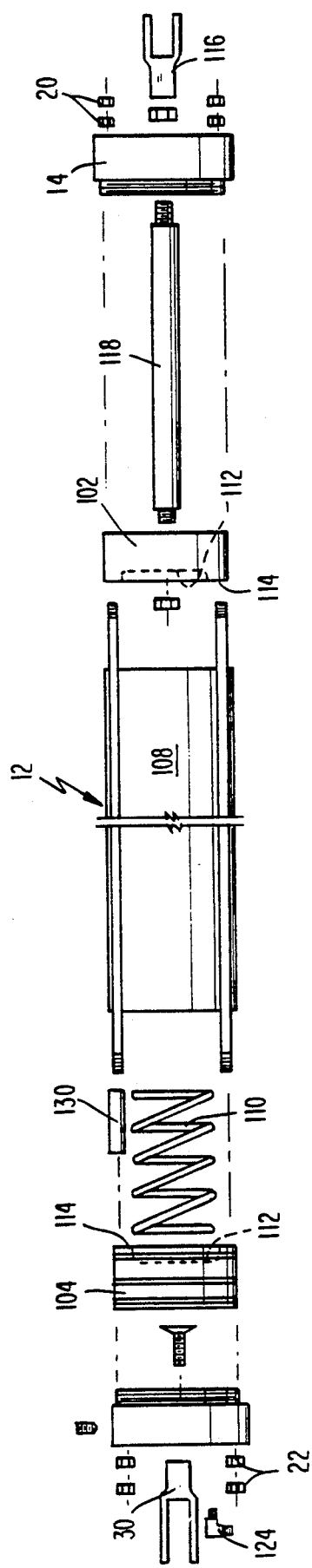
FIG. 2 is an exploded perspective view of a piston and cylinder arrangement in accordance with an improvement feature of my present invention.

In accordance with the present invention, with reference now to FIGS. 2 and 3, the piston and cylinder arrangement 12 of my prior invention depicted in FIG. 1 is modified to include a pair of first and second pistons 102 and 104 slidably disposed within the cylinder 12 in sealing contact through O-rings 106 with the inner cylindrical surface 108 thereof. A compression spring 110 is interposed between the piston heads 102,104 and includes opposite ends respectively received in cylindrical recesses 112 formed in opposing faces 114 of the piston heads, respectively. The second or upper piston head 102 is interconnected to a clevis 116 through a connecting piston rod 118 extending slidably through the upper end cap 14. This clevis 116 is in turn connected to a crank arm such as 44 in FIG. 1 to rotate a scraper element of the type depicted in my prior '523 patent or my '524 patent in the manner described therein. The disclosures of both patents are hereby incorporated by reference in their entireties.

The compression spring 110 is selected to have spring characteristics sufficient to transmit line pressure to the upper piston head 102 from the lower piston head 104 preferably without completely compressing the spring to its fullest. Therefore, it is preferred to have sufficient slack within the piston to allow for further compression and kick back of the scraper elements in the event they contact splices within the belt.

In the event the piston and cylinder arrangement of this invention is utilized in conjunction with the resilient blade scraper units of my '523 patent, it will be appreciated that some of the incidental shock loading will be absorbed by the blade scraper units themselves due to their resilient nature, particularly when used as a secondary scraper assembly located through contact with the lower run or return of the conveyor belt to effect a secondary scraping action as disclosed in my '523 patent. The remainder of any incidental shock loading is advantageously absorbed by the spring loaded piston and cylinder arrangement of the present invention. Such reverse shock loading occurs when the scraper edge is suddenly rotated out of contact with the conveyor belt (e.g., by striking a belt splice or large piece of detritus) which in turn causes reverse rotation of the crank and downward movement of the second or upper piston head 102 towards the first piston head 104 which is maintained relatively stationary by the force of the pressurized fluid acting on the first piston side opposite the spring 110. In this manner, the spring 110 is subject to further compression as the second or upper piston head 102 moves towards the first or lower piston head 104 to absorb the incidental shock. Afterwards, the spring 110 automatically extends to bias the scraper edge back into normal scraping contact with the conveyor belt.

The spring loaded piston and cylinder arrangement of this invention can also be used with a scraper assembly where the scraping edge or the entire blade body and/or support assembly therefor are made of a hard material such as metal. In this type of usage, the spring 110 is of particular importance since there is no other resilient means capable of absorbing at least some of the incidental shock loading.

The selection of a suitable spring 110 will be obvious to one of ordinary skill in the art as a result of reviewing this disclosure. Obviously, the selection of the spring compressive strength, coil diameter, length, etc., will be governed by the length and width of the belt being cleaned and the material being cleaned from the belt.

For example, a material having greater adhesive characteristics (e.g., clay material sticking to the belt surface) requires a spring of greater compressive strength to firmly maintain the scraping edge in firm or positive scraping contact with the belt surface.

The pressurized working fluid may be water, air, or other types of pressurizing fluids as well known in the art. However, in accordance with another preferred feature of the present invention, a grease is preferably utilized as the working fluid, particularly a lubrication grease which is commonly utilized in the lubrication of machine components such as with a hand grease gun. This type of grease is usually in abundant supply at locations utilizing conveyor belts which must be cleaned. With reference to FIG. 3, the grease is preferably injected into the cylinder chamber 120 through a flexible line 122 secured to the lower end cap 16 with an elbow 124. The end cap 16 has passageways (not shown) communicating the interior 120 of the cylinder 12 with the supply line 122 through the supply elbow 124. A check valve 126 and grease fitting 128 are located at the free end of the line 122 for connection to the hand grease gun in a known manner.

In operation, grease is injected into the cylinder chamber 120 through the supply line 122 which initially causes movement of the lower piston head 104 which is transmitted through the spring 110 to the upper piston head 102, connecting piston rod 38 and crank 44 to rotate the scraper unit(s) into contact with the conveyor belt. As additional grease (or other fluid) is injected into the cylinder 12, the lower piston head 104 continues to compress the spring 110 and thereby load the scraper mechanism. When the spring 110 is compressed to a predetermined length corresponding to a desired degree of loading or force applied by the scraper unit to the conveyor belt, the supply of grease or other working fluid into the cylinder is terminated. The check valve 126 prevents reverse flow or leakage of the working fluid out of the cylinder 12.

In accordance with a further feature of the present invention, a slide 130 in the form of a cylindrical tube is slidably mounted on one of the external tension rods 18 for movement between the end caps 14,16. By placement of the slide 130 laterally adjacent the spring 110, the spring may be compressed to a predetermined length corresponding to the slide length (or a fraction thereof). The slide length is pre-calibrated so that compression of the spring 110 will result in the application of a known calibrated force applied by the scraper edge against the conveyor belt.

The slide 130 of the present invention, in addition to allowing for compression of the spring 110 to transmit a calibrated force, also advantageously provides a means to measure spring fatigue or blade wear. For example, as the spring 110 fatigues, it will be subject to greater compression from a known input force. Conversely, as the scraping edge wears, the spring 110 is subject to further expansion which is also measured by visual comparison of the slide length to the spring length.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. A conveyor belt scraping assembly, comprising:
   (a) a scraper element mounted for movement into contact with a moving conveyor belt for scraping material from the belt; and
   (b) a piston and cylinder assembly for maintaining said scraper element in scraping contact with said belt, said piston assembly movable within the cylinder, said piston assembly being connected through a connecting piston rod to the scraper element, and spring means in the cylinder for resiliently biasing said scraper element against the belt through the connecting piston rod and further comprising check valve means for preventing the flow of fluid from the chamber.

2. A conveyor belt scraping assembly, comprising:
   (a) a scraper element mounted for movement into contact with a moving conveyor belt for scraping material from the belt; and
   (b) a piston and cylinder assembly for maintaining said scraper element means in scraping contact with said belt, said piston assembly movable within the cylinder, said piston assembly being connected through a connecting piston rod to the scraper element, and spring means in the cylinder for resiliently biasing said scraper element against the belt through the connecting piston rod;
   wherein said piston and cylinder assembly includes a first piston and a second piston each disposed within the cylinder and said spring means is positioned between said first and second pistons, said connecting piston rod being connected to the second piston, and means for moving the first piston towards the second piston to thereby compress the spring means and transmit movement to the second piston.

3. The assembly of claim 2, wherein said moving means includes means for admitting a fluid into a chamber formed between the cylinder and a side of the first piston opposite the other side thereof facing the spring means.

4. The assembly of claim 3, wherein said fluid is a liquid.

5. The assembly of claim 3, further comprising check valve means for preventing the flow of fluid from the chamber.

6. The assembly of claim 5, wherein said fluid is a grease.

7. The assembly of claim 6, further comprising a flexible line connected at one end thereof to said chamber and further including a grease fitting at the other or free end thereof connectable with a source of grease.

8. The assembly of claim 7, wherein said check valve is mounted at the free end.

9. The assembly of claim 7, wherein said grease fitting is connectable to a hand grease gun.

10. The assembly of claim 9, wherein said cylinder is transparent to permit visual observation of the piston assembly, and further comprising a pair of end caps respectively mounted to opposite ends of the cylinder; a plurality of connecting rods extending along outer surfaces of said cylinder to interconnect said end caps; and means, mounted for movement along one of said connecting rods, for calibrating the pressure transmitted by the spring means to the scraper element means.

11. The assembly of claim 10, wherein said calibrating means is a tube slidably mounted to one said connecting rod, said tube having a predetermined length acting as a gauge to which predetermined length said spring means is compressed to transmit a certain calibrated pressure to the scraper element means, whereby gradual lengthening of said spring means, relative to said predetermined length, during scraping operations is indicative of scraper element wear and gradual shortening of the spring means, relative to said predetermined length, is indicative of spring wear.

12. The assembly of claim 1, wherein said scraper element means is formed from a hard, substantially non-resilient material.

13. The assembly of claim 11, wherein said scraper element means is formed from a hard, substantially non-resilient material.

14. The assembly of claim 12, wherein said scraper element means includes a metal edge.

15. In a conveyor belt scraping assembly having a scraper element mounted for movement into contact with a moving conveyor belt for scraping material from the belt, and means for maintaining said scraper element in scraping contact with said moving belt, said maintaining means including a piston assembly and cylinder arrangement, the piston assembly being connected through a connecting piston rod to the scraper element, the improvement comprising spring means within the cylinder and operatively connected to the piston assembly for resiliently biasing said scraper element against the belt through the connecting piston rod further comprising check valve means for preventing the flow of fluid from the chamber.

16. A method of cleaning a moving conveyor belt with a scraper element interconnected through a connecting piston rod to a piston assembly movable within a cylinder, comprising the steps of:
   (a) admitting a fluid into one end of the cylinder to compress a spring means within the cylinder through fluid actuated movement of the piston assembly to thereby move the scraper element into cleaning scraping contact with the moving belt; and
   (b) preventing the further admission of fluid into the cylinder after compressing the spring means to a predetermined length which transmits a predetermined force to the scraper element, wherein said fluid is grease which is injected into the cylinder.

17. The method of claim 16, wherein said grease is injected into the cylinder with a grease gun attachable through a grease fitting mounted to a flexible line secured to the cylinder.

18. The method of claim 17, comprising the further step of preventing backflow of grease out of the cylinder by means of a check valve.

19. A method of cleaning a moving conveyor belt with a scraper element interconnected through a connecting piston rod to a piston assembly movable within a cylinder, comprising the steps of:
   (a) admitting a fluid into one end of the cylinder to compress a spring means within the cylinder through fluid actuated movement of the piston assembly to thereby move the scraper element into cleaning scraping contact with the moving belt; and
   (b) preventing the further admission of fluid into the cylinder after compressing the spring means to a predetermined length which transmits a predetermined force to the scraper element, wherein the cylinder is visually transparent and comprising the further step of placing a gauge of predetermined length adjacent both the cylinder and the spring means and admitting fluid into the cylinder until the spring means is compressed to said predetermined length as visually observed with said gauge.

20. A method of cleaning a moving conveyor with a scraper element interconnected through a connecting piston rod to a piston assembly movable within the cylinder, comprising the steps of:
   a) admitting a fluid into one end of the cylinder to advance the piston assembly within the cylinder through fluid actuated movement thereof to thereby move the scraper element into cleaning, scraping contact with the moving belt; and
   b) preventing the further admission of fluid into the cylinder after moving the scraping element into said cleaning, scraping contact with the moving belt, wherein said fluid is a grease which is injected into the cylinder and prevented from back-flowing out of the cylinder.

21. A method of cleaning a moving conveyor with a scraper element interconnected through a connecting piston rod to a piston assembly movable within the cylinder, comprising the steps of:
   (a) admitting a fluid into one end of the cylinder to advance the piston assembly within the cylinder through fluid actuated movement thereof to thereby move the scraper element into cleaning, scraping contact with the moving belt; and
   (b) preventing the further admission of fluid into the cylinder after moving the scraping element into said cleaning, scraping contact with the moving belt, wherein said fluid is injected into the cylinder and prevented from backflowing out of the cylinder.

* * * * *